United States Patent
Priller et al.

(10) Patent No.: US 7,966,116 B2
(45) Date of Patent: Jun. 21, 2011

(54) METHOD FOR CONTROLLING A DUAL CLUTCH TRANSMISSION DURING SHIFT

(75) Inventors: Heiko Priller, Karlsruhe (DE); Thomas Weber, Muggensturm (DE); Juergen Eich, Buehl (DE); Tobias Kalisch, Villingen (DE); Ralf Hettich, Filderstadt (DE); Marc Kramer, Rottweil (DE); Martin Seufert, Steinheim (DE)

(73) Assignees: LuK Lamellen und Kupplungsbau Beteiligungs KG, Buehl (DE); Getrag Getriebe-und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 0 days.

(21) Appl. No.: 12/715,847

(22) Filed: Mar. 2, 2010

(65) Prior Publication Data
US 2010/0152986 A1 Jun. 17, 2010

Related U.S. Application Data

(63) Continuation of application No. PCT/DE2008/001475, filed on Sep. 3, 2008.

(30) Foreign Application Priority Data

Sep. 6, 2007 (DE) .................... 10 2007 042 430

(51) Int. Cl.
*G06F 19/00* (2011.01)

(52) U.S. Cl. ............................................ 701/68; 701/87
(58) Field of Classification Search .................... 701/58, 701/68, 71, 87; 477/175
See application file for complete search history.

(56) References Cited

U.S. PATENT DOCUMENTS

| 5,303,794 A | 4/1994 | Hrovat et al. | |
|---|---|---|---|
| 2005/0064990 A1* | 3/2005 | Berger | 477/107 |
| 2005/0216166 A1* | 9/2005 | Kjell et al. | 701/87 |
| 2009/0192018 A1* | 7/2009 | Hoffmeister et al. | 477/176 |
| 2010/0017089 A1* | 1/2010 | Song et al. | 701/74 |

FOREIGN PATENT DOCUMENTS

| DE | 196 53 935 A1 | 6/1998 |
|---|---|---|
| EP | 1 637 424 A | 3/2006 |
| WO | 2005019676 A1 | 3/2005 |

\* cited by examiner

*Primary Examiner* — Khoi Tran
*Assistant Examiner* — Brian J Broadhead
(74) *Attorney, Agent, or Firm* — Simpson & Simpson, PLLC

(57) ABSTRACT

A method for controlling dual clutch transmission with at least two partial drive trains, each arranged to be coupled with an engine by means of a clutch, in that, a first clutch of an actively operated partial drive train currently transmitting torque is opened, whereas a second clutch of the partial drive train not actively operated is closed in the already engaged gear and determining a reduction of a maximum possible lateral guiding force of at least one drive wheel and determining torque transmitted by the clutches, wherein, in the case of reduction of the maximally possible lateral guiding force below a default value and in the case that torque is transmitted by both clutches, the torque of one of the clutches is reduced.

12 Claims, 2 Drawing Sheets

METHOD FOR CONTROLLING A DUAL CLUTCH TRANSMISSION DURING SHIFT

CROSS-REFERENCE TO RELATED APPLICATIONS

This application is filed under 35 U.S.C. §120 and §365(c) as a continuation of International Patent Application PCT/DE2008/001475, filed Sep. 3, 2008, which application claims priority from German Patent Application No. DE 10 2007 042 430.4, filed on Sep. 6, 2007, which applications are incorporated herein by reference in their entireties.

FIELD OF THE INVENTION

The invention relates to a method for controlling dual clutch transmission with two drive trains that can be coupled with an internal combustion engine.

BACKGROUND OF THE INVENTION

Such dual clutch transmissions are used in motor vehicles, as power shift transmission. Power shift operation can take place because each partial drive train can be operated independently of the second partial drive train. For instance, in one partial drive train, the clutch can be closed and a gear selected with which this vehicle is driven. During an operation, a gear with a different transmission ratio can be selected in a second partial drive train. If gearshifting should take place, the clutch of the currently operated partial drive train is opened, whereas the clutch of the partial drive train to be activated anew is closed. During such a process—termed overlapping phase or overlapping gearshift—both clutches transmit torque to their respective partial drive trains. To avoid straining the output because of different transmission ratios of selected gears in both partial drives, the sum of transmittable torque values on both clutches may not exceed significantly the torque to be transmitted (e.g. the engine torque).

BRIEF SUMMARY OF THE INVENTION

The object of the present invention is to improve the method for controlling dual clutch transmissions. In particular, improved safety of the driving characteristic should be attained and the dual clutch protected from damage.

The object is met by means of a method for controlling dual clutch transmission with at least two partial drive trains, of which, each partial drive train can be coupled with an internal combustion engine, by means of a clutch and dual transmission gearshift, in that, the clutch is opened by the actively operated partial drive train that is currently transmitting torque, whereas the clutch of the partial drive train that is not actively operated is closed in the already engaged gear, and a device for either determining or estimating the reduction of the maximum possible lateral guiding force factor, owing to brake slip for the current road conditions, of at least one drive wheel, and of a device for determining the torque transmitted by the clutch, wherein, in case the lateral guiding force factor is reduced below a default value and in case torque is transmitted by both clutches, the torque of at least one clutch will be reduced. Starting from dual clutch transmission with two clutches, which can be operated as wet or as dry friction clutches, and which are preferably opened clutches (normally open) in the released state, the proposal intends to incorporate the grip of wheels, particularly of the drive wheels, in the control of clutches and hence of dual clutch transmission.

The control system for the proposed method comprises either a central control device, which, as a central unit, can take over the control processes of the vehicle entirely, or by means of a transmission control device that comprises the control system for the transmission together with clutches, or as a transmission control device that only takes over the control function for both clutches. Every other arbitrary combination with another control device, for instance the control device for sensing and determining the wheel speeds, can likewise be advantageous. In the application case of several control devices, the transport of data and supply energy can proceed by means of separate supply and control lines between the control devices communicating with one another and the peripheral devices like sensors and actuators. Data can be transmitted alternatively or additionally via a data bus, for instance CAN bus.

The method is preferably executed as a program routine stored in a control device, wherein the latter can be embedded and invoked in a complex program, in the form of program code. The routine can be invoked currently during an overlap gearshift and/or in regularly recurrent cycles, in order to ensure that in the selected time windows, in which the routine is invoked, not both clutches transmit torque, which leads to straining or blocking the drive train whilst causing grip loss on drive wheels. Such irregularities can also occur independently of a currently executed overlap gearshift, particularly when one of the couplings is jammed, for instance, because this activating actuator is jammed or is defective—this comprises activating kinematics and drives.

All kinematic systems with drives, and activation kinematics for displacing levers or diaphragm springs, and which serve to convert drive into linear motion for disengaging and engaging the clutch, by axially loading the activation elements of the clutch, can serve as actuators. The drive can consist of an electric motor that, for instance, introduces rotary motion into the activation kinematics that convert the latter into linear movement, a hydraulic pump or pressure accumulator filled with pressure medium, which can exert pressure on a hydraulic cylinder, a pneumatic accumulator or an electromagnetically operated actuator. It is obvious that advantageous combinations of drives and kinematic elements of different functions can find application, for instance, a hydraulic master cylinder driven by means of an electric motor, which activates a slave cylinder via a hydraulic line, whereby the latter can pressurize the activating elements of the clutch directly or by means of a lever-arm mechanism. The two clutches can be operated with different actuators.

The assignment of torque to be transmitted via the clutches takes place advantageously by correlation of torque to be transmitted in dependence upon the distance covered on the activating element of clutch, wherein a reference point is determined via the so-called measuring point, whereby only negligible torque is transmitted. Starting from this reference point, torque can be determined via clutch position, whereby the correlation parameter can be stored in the control device and updated depending upon the operation of the vehicle, for instance, short-term changes like temperature influences and long-term changes like wear or aging are considered.

The position is measured by means of sensors, for instance incremental position sensors calibrated at a definite position and cover a relative distance by counting increments. Particularly advantageous is the application of control elements of an electronically commutating electric motor used as drive, whereby in motion kinematics, the rotary motion of the electric motor is assigned to the axially covered distance of the activating elements of the clutch.

The torque transmitted by the two clutches is determined from the position signals or from other or further information, for instance from the characteristics of internal combustion engine, and in the case of reduction of momentary lateral guide force factor under a limit relative to the maximum possible lateral guide force factor under momentary road conditions on at least one drive wheel and when transmitting torque via both clutches, clutch torque of one or both clutches will be reduced. The reduction of torque can occur in dependence upon reduction of the lateral guide force factor, so that, in case of intensive reduction, the torque is decreased more intensively than in the case of minor reduction. The choice of the clutch on which torque is decreased can depend on different parameters and on their combination. For instance, the opening state of a clutch can be exploited. For a clutch that is nearly closed, more torque can be reduced within the default time by means of a short clutch displacement than when a clutch is closed just a bit; this can eliminate the critical state quickly. Furthermore, the slip present on both clutches at the time the loss of maximum possible lateral guide force occurs can be exploited and the clutch that operates with little slip can be opened further, since this transmits little torque in general and hence a more rapid reaction to the loss of maximum possible lateral guide force is possible. Moreover, the reaction to a change of clutch position can be used as parameter. It can happen that a clutch or its activating kinematics is blocked so that in its meshing state this clutch can be changed only slowly or never. By recording and evaluating the change or rate of change of clutch position, the decision about which clutch can be used can be made more quickly or at all to reverse the maximum possible lateral guide force.

It is understandable, with the method in the first place, that a reduced maximum lateral guide force, which should be counteracted by blocking the dual clutch transmission by means of torque input of both clutches on the output and hence on the drive wheels, the maximum possible lateral guide force again depends on the condition of the road and when the road is smooth the maximum possible lateral guide force is accordingly lower.

An evaluation of the reduction of maximum possible lateral guide force factor can occur on one drive wheel or on both or in the case of an 4-wheel drive on all wheels, wherein the wheels can be evaluated individually, wherein, for each wheel a reduction of the lateral guide force factor can be determined, calculated and evaluated. A cumulative value upon which the evaluation for activating the routine for minimizing transmitted torque via the clutch can be formed from several wheels alternatively. The reduction of the maximally possible lateral guide force factor itself is determined in an advantageous manner from the wheel slip, the quotient of the difference in rotational speeds and vehicle speed. The difference in rotational speeds composes of the difference of vehicle speed and the circumferential wheel speed. Based on this definition, the wheel slip is "0" when circumferential wheel speed and vehicle speed are identical. The lateral guide force factor in this case is maximal for the specified roadway conditions. As with completely blocking wheels that corresponds to 100% wheel slip, the driving speed is greater than "0" and the wheel speed is equal to "0," thus, the drive wheel is stationary. Additionally or alternatively, the described evaluation of signals effective in the driving direction, the so-called lateral force factor that accounts for the lateral guide force of a drive wheel can be evaluated to introduce the routine for preventing the transmission of torque via both clutches. This is particularly then advantageous when the vehicle already possesses a sensing system for determining lateral vehicular dynamics, for instance owing to the installation of a system for enhancing driving stability (e.g. ESP). The speed variables can be recorded and calculated by means of sensors, for instance, wheel speed sensors. As activation value for easing off the torque to be transmitted via both clutches, values for wheel slip from 20 to 50%, preferably 30%, can be advantageous. Vehicle speed can either be acquired via a special sensor system for determining the speed above the ground (e.g., radar, GPS signals evaluation and others). Alternatively, vehicle speed can be estimated at the beginning of an overlap through the circumferential wheel speed and during the short overlap phase be assumed constant as an approximation. This corresponds to the extreme case assumption that the vehicle, for instance, skids as on frozen road surface without reduction of vehicle speed. A sensor for vehicle speed is not required in that respect. Alternatively, vehicle speed can be estimated through the circumferential wheel speed at the beginning of overlap and during the overlap with maximum retardation on ice. The state of a reduced maximum lateral force factor can alternatively also be determined based on wheel speed gradients. In this case, the wheel speed gradient is evaluated and in case the gradient with a negative sign is too large, a state with a reduced maximum lateral force factor (partly blocked wheels) is assumed.

Particularly advantageous in this connection is the response of the electronic stability program (ESP). The response of ESP can additionally or alternatively be used as a value for introducing the routine for reducing the torque transmitted via both clutches, for instance, the signal present on the CAN bus can be evaluated.

The proposed routine for monitoring the reduction of the maximum possible lateral force factor and the reduction of clutch torque when both clutches transmit torque is a so-called robust monitoring method, which, as a result of low quality requirements on measuring signals as with a limited number of input variables, is relatively insensitive against, for instance, sensor failures caused by line breaks or defects. To safeguard the method additionally, activating the routine can be made dependent upon whether a gear is engaged in both partial drive trains. Additional or alternative limitation can be a value for a limit vehicle speed under which the routine is not started, thus, the torque of one or both clutches is not reduced further, since loss of lateral guide force as at lower speeds has little effects on the stability of the vehicle. For instance, such a limit value can be specified between 5 and 25 km/h.

It has appeared advantageous when, during a reduction of the torque on one or on both clutches, the position of the clutch is detected and evaluated. Should the clutch not return in the desired nominal position as activated, appropriate error measures can be initiated. For instance, in the event of error, when the clutch does not return in the default position, the other clutch can be activated, engaged gears can be disengaged forcefully and/or the internal combustion engine can be regulated downwards or stopped. Such measures can be initiated particularly, when, in an extremely improbable situation, both clutches are no longer controllable.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
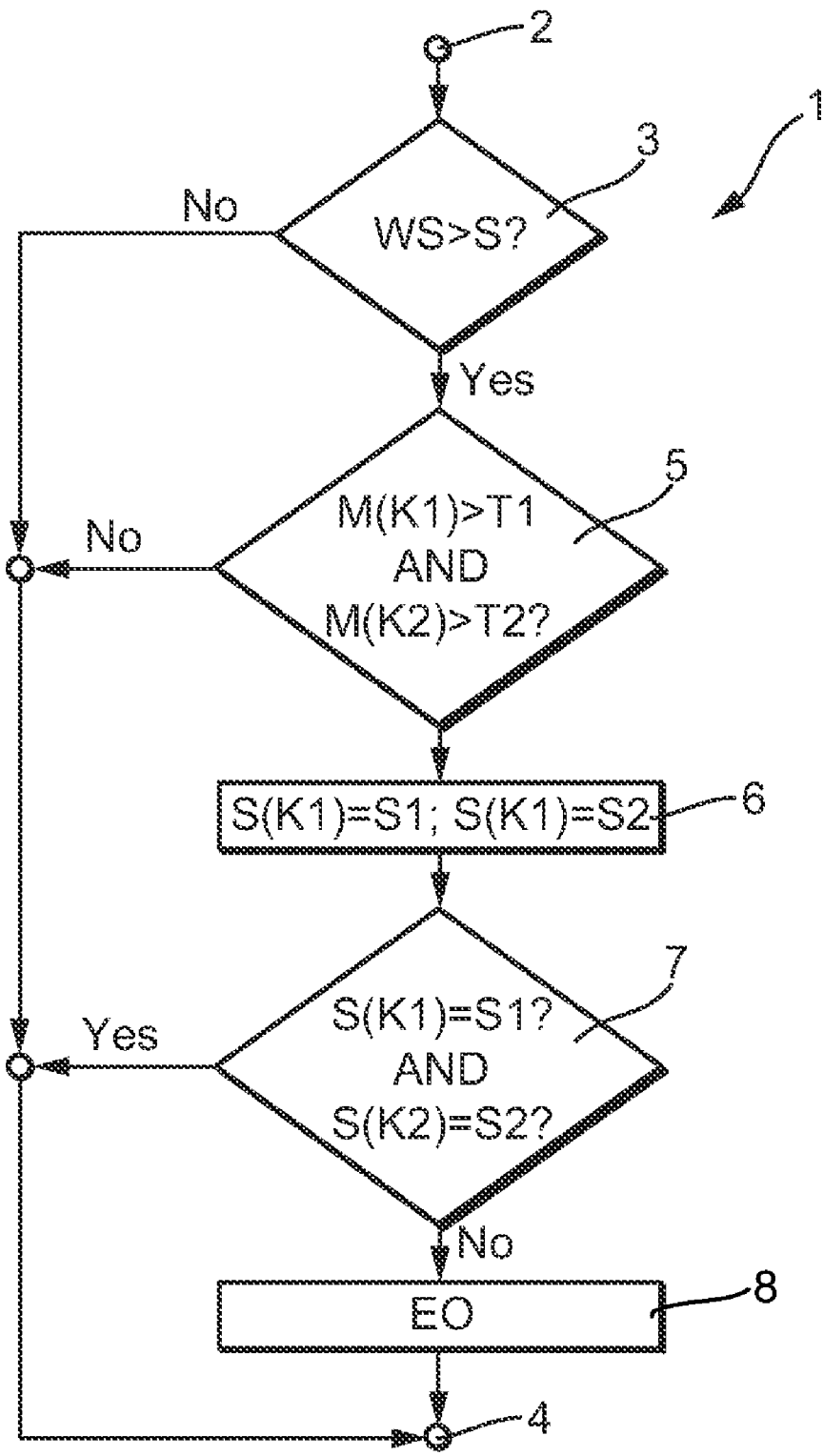
FIG. 1 shows an exemplary embodiment of a routine for executing the proposed method; and, FIG. 2 shows a diagram for illustrating the torque sequence during a reduction of clutch torque.

FIG. 1 shows a routine 1 with a start point 2 with one of the following branches 3, in which a decision is made whether grip on vehicle's driven wheels is reduced. For instance, it is verified whether wheel slip WS is greater than a default value S, for instance, greater than 30%, or the gradient of the wheel speed exceeds a maximum value in negative direction (retardation). If the condition is not fulfilled, routine 1 is terminated in the end point 4. If the grip is reduced, thus, for instance, if wheel slip WS is greater than the default value S, it will be determined in branch 5, whether both clutches transmit torque. The determination of wheel slip can occur by means of an evaluation of wheel speed sensors or of the speed of a transmission output shaft, in that, the speed of the transmission output shaft and the driving speed correlate with one another.

The acquisition of clutch position can occur respectively by means of a position-measuring device disposed on clutch actuators. In the process, the torque values M(K1), M(K2) transmitted by the clutches are determined from clutch positions. It is obvious that to determine torque transmission via both clutches also the clutch positions can be evaluated directly. When torque is transmitted only via one clutch, the reduction in grip does not result from one transmission blockage and the routine 1 is terminated again. When both clutches are active, that is, both clutches transmit torque M(K1), M(K2) greater than the associated limit torque T1, T2, the routine in block 6 will be continued.

In block 6 the control variables S(K1), S(K2) are assigned to new nominal values S1, S2. Thereby, depending upon the control variables V(C1), V(C2), or on transmitted torque values T(C1), T(C2), or on the wheel slip variable WS or on further variables, both clutches are assigned to different correcting values, wherein a correcting value S1 or S2 can also be unchanged, whereby the torque transmitted by this clutch is not changed.

In a further process of routine 1, in branch 7 it is checked whether the new specified nominal values S1, S2 were set within a default tolerance window. If this is the case, the routine will be terminated, if not applicable, an emergency operation EO will be switched in block 8. Error control measures will be carried out in the emergency operation. For instance, actuators can be operated with greater force, engaged gears disengaged, an engine intervention in the internal combustion engine executed, automated brakes actuated and/or the ESP activated.

The routine 1 will be terminated at the endpoint 4.

Figure 2:
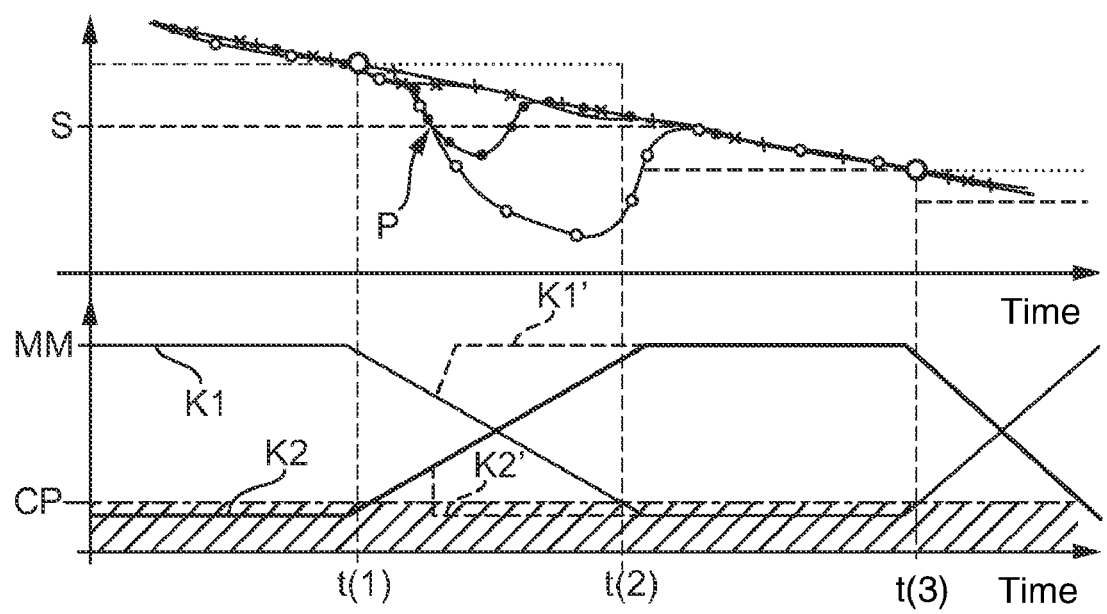

FIG. 2 shows a two-part diagram, in which, in the top part, the speed is plotted against time and in the bottom, the adjusting positions of the two clutches are plotted against time. The bottom hatched part shows adjusting positions of the clutches, in which no torque is transmitted. The monitored overlap gearshift is depicted in which in the lower part diagram, the clutch positions K1, K2 of the two clutches are shown over time for an undisturbed sequence with continuous lines. Starting from the contact point CP, in which none or only negligible torque is transmitted, the clutches can be closed up to a maximum above the maximum torque MM that can be transmitted by the clutch. In the depicted diagram, the first clutch is closed up to; maximum torque MM at the beginning and the second clutch is opened beyond the contact point CP. From the top part diagram, it becomes clear that the vehicle is retarded slowly. The line marked "+" reproduces the speed of the vehicle. At the beginning, there is no wheel slip, also meaning that the circumferential wheel speed marked "o" moves analogously with the vehicle speed. At the time point t(1) or—as depicted—shortly before hand, an overlap gearshift is initiated, which at the time point t(1) directly follows the wheel slip monitored by a control device depending upon the stored gearshift points or initiated by the driver. In the top part diagram three different sequences are depicted, which respectively reflect different slip situations.

The line marked with "o" shows the circumferential wheel speed of a slip situation without the proposed method. Between the time point t(1), as with a beginning overlap gearshift and then terminated in the time point t(2) area, the speed of wheel circumference decreases significantly. This means that in the case of torque input in both clutches—see, the clutch positions K1, K2, in the bottom part diagram—due to straining of transmission, a grip loss of the drive wheels occurs relative to the driving road surface. The extent to which the wheel speed or circumferential wheel speed caves in depends upon the coefficient of friction of the wheel pair tire/road surface. Only substantially, after the overlap, gearshift does the wheel or brake slip becomes stabilized again and the circumferential wheel speed equals the driving speed.

The line marked with "x" shows a situation of an overlap gearshift without significant slip. The circumferential wheel speed decreases only slightly and remains above the specified value S, which, according to the calculation, forms the wheel slip, the rotation speed decrement of the driven wheel, and the circumferential wheel speed, can assume a corresponding dimension and magnitude and depicts a limiting velocity.

The line marked with "•" shows a situation, in which, with an increase in displacement of clutch position K1 towards open clutch and of the clutch position K2 towards closed clutch, straining of dual clutch transmission occurs, which decreases the value S of the circumferential wheel speed. At point P the value S will be reached and the clutch K2 will be opened fully in the depicted example, so that it does no longer transmit any torque, as depicted in the dashed line K2'. Depending on the driving situations it can be advantageous, additionally to raise the clutch position K1 based on the dashed line K1' such that the clutch again transmits the full torque. As result of the measures initiated on the clutch K2 and if necessary on K1 the wheel slip decreases and thus the grip of the drive wheels increases again and a corresponding dangerous situation marked "o" in the line, in which the vehicle can skid, can be avoided. In the depicted example, the overlap gearshift is quasi interrupted. In other exemplary embodiments, it can be advantageous when the gearshift is accelerated, in that, the clutch K1 is reduced to zero torque and the clutch K2 is moved up to torque transmission, which allows the transmission of coast to the internal combustion engine. This can in particular be advantageous then, when uncomfortable gearshift with a relatively good grip of drive wheels on the road surface can be assumed.

The next overlap gearshift will be initiated at the time point t(3).

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE SYMBOLS

1 Routine
2 Start point
3 Branch
4 End point
5 Branch
P Point
6 Block
S Value
7 Branch
8 Block
WS Wheel slip
K1 Clutch/clutch assembly
K1' Line
K2 Clutch/clutch assembly
K2' Line
T1 Limit torque
T2 Limit torque
T(C1) Torque
T(C2) Torque
MM Maximum torque
P Point
S Valve
V(C1) Control variable
V(C2) Control variable
S1 Correcting value
S2 Correcting value
CP Contact point
t(1), t(2), t(3) Time points

What we claim is:

1. A method for controlling dual clutch transmission with at least two partial drive trains, each arranged to be coupled with an engine by means of a clutch, in that, a first clutch of an actively operated partial drive train currently transmitting torque is opened, whereas a second clutch of the partial drive train not actively operated is closed in the already engaged gear and determining a reduction of a maximum possible lateral guiding force of at least one drive wheel and determining torque transmitted by the clutches, wherein, in the case of reduction of the maximally possible lateral guiding force below a default value and in the case that torque is transmitted by both clutches, the torque of one of the clutches is reduced.

2. The method according to claim 1, wherein the reduction of the maximally possible lateral guide force is determined from a quotient of vehicle speed and circumferential wheel speed of the at least one driven wheel.

3. The method according to claim 1, wherein the reduction of the maximally possible lateral guide force is determined from a gradient of circumferential wheel speed of the at least one driven wheel.

4. The method according to claim 1, wherein vehicle speed is approximated during an overlap of the two clutches for changing the torque from one partial drive train to the other partial drive train by means of a value of circumferential wheel speed of the at least one driven wheel measured directly prior to the overlap.

5. The method according to claim 4, wherein the driving speed during the overlap is reduced with a maximum retardation on an icy road surface.

6. The method according to claim 1, wherein the grip is determined from a lateral force factor characteristic of the lateral guide force of the vehicle.

7. The method according to one of the claim 1, wherein the torque is only reduced when a gear is engaged in both partial drive trains.

8. A method according to one of the claim 1, wherein the torque is only reduced when the driving speed exceeds a default value.

9. The method according to one of the claim 1, wherein the torque is transmitted via the clutches by setting a position of each clutch.

10. The method according to claim 9, wherein the position of each clutch is monitored during torque reduction.

11. The method according to claim 1, wherein an error operation is activated in case of non-occurrence of torque reduction on both clutches.

12. A method for controlling dual clutch transmission with at least first and second partial drive trains, the first and second partial drive trains arranged to be coupled to an engine by use of respective first and second clutches, said method comprising:
(a) opening the first clutch corresponding to the first partial drive train, wherein the first partial drive train is an actively operated partial drive train which is transmitting torque;
(b) closing the second clutch corresponding to the second partial drive train, wherein the second partial drive train is a non-active partial drive train;
(c) determining a reduction of a maximum possible lateral guiding force of at least one drive wheel, said at least one drive wheel controlled by at least one of the partial drive trains;
(d) determining torque transmitted by the first and second clutches; and,
(e) reducing the torque of one of the first or second clutches if the reduction of the maximally possible lateral guiding force is below a default value and both the first and second clutches are determined to be transmitting torque in step (d).

* * * * *